US007967390B2

(12) United States Patent
MacNeil et al.

(10) Patent No.: US 7,967,390 B2
(45) Date of Patent: Jun. 28, 2011

(54) MACHINE AND METHOD FOR DECONSTRUCTING A VERTICAL WALL

(75) Inventors: Gerard MacNeil, Surrey (CA); David MacNeil, Langley (CA); Gordon MacNeil, Delta (CA); Vernon Bose, Langley (CA)

(73) Assignee: Mac & Mac Hydrodemolition Inc., Surrey (CA)

( * ) Notice: Subject to any disclaimer, the term of this patent is extended or adjusted under 35 U.S.C. 154(b) by 631 days.

(21) Appl. No.: 11/754,128

(22) Filed: May 25, 2007

(65) Prior Publication Data

US 2008/0041015 A1 Feb. 21, 2008

Related U.S. Application Data

(63) Continuation-in-part of application No. 10/973,281, filed on Oct. 27, 2004.

(51) Int. Cl.
*B28D 1/00* (2006.01)
(52) U.S. Cl. ............................................. 299/17; 299/75
(58) Field of Classification Search ...................... 299/17
See application file for complete search history.

(56) References Cited

U.S. PATENT DOCUMENTS

| | | | |
|---|---|---|---|
| 3,809,318 A | 5/1974 | Yamamoto | |
| 3,857,516 A | 12/1974 | Taylor | |
| 4,045,086 A | 8/1977 | Parkes | |
| 4,074,858 A | 2/1978 | Burns | |
| 4,081,200 A | 3/1978 | Cheung | |
| 4,111,490 A | 9/1978 | Liesveld | |
| 4,795,217 A | 1/1989 | Hilaris | |
| 4,813,313 A * | 3/1989 | Ichikawa et al. ................. 82/128 |
| 4,854,770 A * | 8/1989 | Puchala et al. .................... 404/75 |
| 5,010,694 A | 4/1991 | Agbede | |
| 5,022,927 A | 6/1991 | Seidel | |
| 5,255,959 A | 10/1993 | Logeal | |
| 5,765,924 A | 6/1998 | Liesveld | |
| 6,179,519 B1 * | 1/2001 | Hilmersson ..................... 404/91 |
| 6,877,930 B2 | 4/2005 | Stromdahl | |
| 2001/0000003 A1 * | 3/2001 | Cope ............................. 182/141 |
| 2005/0077775 A1 * | 4/2005 | Nakakuro ....................... 299/17 |

FOREIGN PATENT DOCUMENTS

WO    WO 2006/455198    5/2006

* cited by examiner

*Primary Examiner* — John Kreck
(74) *Attorney, Agent, or Firm* — Vermette & Co.

(57) ABSTRACT

A machine and method are disclosed for deconstructing walls and other substantially vertical surfaces. The machine comprises a static, stand-alone support-frame. A carriage is movably mounted on the support-frame, which carriage is operable to be raised and lowered along the support-frame adjacent to a workface. To the carriage are mounted one or more nozzles, preferably the nozzles are mounted to the carriage by means of a nozzle carrier that is operable to move back and forth along the length of the carriage. The nozzles are connected to a high-pressure supply of an erosive material, preferably water. The erosive material, when forced through the nozzles, form jet streams that are directed against the surface of the workface, thereby eroding the surface.

Optionally, the invention comprises means of yawing or means of rotating the nozzles in order to access the sidewalls of the opening in the workface produced by the invention.

Optionally, the invention comprises means of adjusting the nozzles towards or away from the workface surface in order to maintain an optimal gap between the nozzle and the workface surface as the opening gets deeper.

Optionally, the invention comprises a work platform mounted on the support-frame and operable to be raised and lowered along the support-frame, thereby providing access to the workface for workers cutting rebar and carrying out other ancillary tasks.

18 Claims, 6 Drawing Sheets

MACHINE AND METHOD FOR DECONSTRUCTING A VERTICAL WALL

RELATED APPLICATIONS

The present application is a continuation-in-part of U.S. application Ser. No. 10/973,281 filed on Oct. 27,2004.

BACKGROUND OF THE INVENTION

1. Field of the Invention

The present invention relates to machines and methods for removing constituent materials and supporting elements from substantially vertical surfaces.

2. Scope and Usage of Certain Terms

The following lexicon sets forth the intended scope and meaning of certain terms and concepts used herein. Examples provided are intended to clarify and not to limit the meaning of the respective term. The definitions set forth here include the singular, plural, and grammatical variations and congeners of the terms defined.

"Wall" and "substantially vertical surface" are used herein interchangeably to mean any surface amenable to being deconstructed by the present invention, and specifically walls and surfaces having an upright orientation within about 45 degrees of plumb.

"Deconstruction" refers to the process of dismantling a wall or portion of a wall by removing its constituent material and supporting elements. "Constituent material" refers to the ground substance constituting the wall, such as concrete, brick, mortar, and the like. "Supporting elements" refers to rebar or other supporting materials that contribute to the structure of the wall.

"Workface" refers to a portion of a wall that is to be deconstructed by the present invention.

"Erosive material" is a generic term referring to any suitable material, whether a solid, liquid, or gas, that can be forced through a nozzle at high pressure to produce a sufficiently forceful jet stream required to erode the constituent substance of the wall. Although the preferred erosive material with respect to the present invention is water, the scope of the disclosure and claims includes any material that can be used to deconstruct a wall using the machine and method disclosed and claimed. "Jet stream" refers to a jet stream of an erosive material.

"Static support-frame" refers to a support-frame that has the characteristics of being stationary, free-standing, and immovable during the deconstruction process. More specifically, after it has been set into position adjacent a workface, the static support-frame is not lifted up and down along the workface by a crane, cherry-picker, or other lift means, nor is the static support-frame mounted on a vehicle or otherwise mobile for moving along the wall during the deconstruction process.

"Work platform" refers to a substantially horizontal, flat surface upon which one or more workers stand to gain access to a workface.

"Along the length" refers to a type or direction of movement of one element with respect to a reference element. Thus, the phrase does not imply, and is not meant to imply, that a first element traverses the entire length of the reference element. Movement "along the workface" refers to movement of an element that is, in relevant part, along or substantially within the boundaries of the workface. The terms "along the length" and "along the workface" do not imply, and are not meant to imply, that the moved element necessarily rides upon or is in contact the reference element or workface.

Statement of the Problem Solved by the Invention

The problem addressed by this invention is how to deconstruct walls, or portions of walls. For example, when it becomes necessary or desirable to remove a large piece of equipment from the inside of a concrete structure, often the only way to gain access to the equipment is to breech a hole in a concrete wall and remove the equipment through the hole.

A deconstruction process referred to as "hydro-demolition" is often employed in such situations, and a number of hydro-demolition machines and techniques have been developed for these purposes. Hydro-demolition is practiced by forcing an erosive material, generally a liquid such as water, through nozzles at sufficiently high pressure to produce a jet stream that disintegrates the constituent building material, which is normally concrete. The term "vertical hydro-demolition" refers to the application of hydro-demolition techniques to deconstruct walls.

A major problem in vertical hydro-demolition is getting the equipment and the personnel in position adjacent to the workface and sufficiently close to the workface to effectuate the removal of the material constituting the wall In many situations the workface is a considerable distance off the ground and so various vehicle mounted lifts, cherry-pickers, and other such crane-type devices have been employed to meet this challenge. A major disadvantage of this approach is that the great volume of concrete that is removed from the workface falls down upon the vehicle or on the lift mechanism, partially burying it and possibly damaging it. What is needed is a means of raising and lowering hydro-demolition equipment and personnel along a workface coupled with a means for moving the equipment back and forth across the workface without resorting to vehicular devices or crane-type lift devices.

Another aspect of the problem solved by the invention relates to the thickness of the workface. Typically, a nuclear reactor concrete housing has a thickness of the order of 4 feet. In order to breech such a wall, a system must be in place that allows the hydro-demolition nozzles to travel all the way into the opening that is being produced in the workface. Consequently, it is desirable to keep the nozzle carrier, which is considerably wider than the nozzle, from contacting the edge of the opening as the nozzles penetrate the opening because such contact prevents lateral movement of the nozzles and thus prevents access of the jet stream all the way to the edge of the opening, thus shorter and shorter lateral passes result for each of a set of passes. The net effect is side edges of the opening stepped towards the center as the opening grows deeper, thereby narrowing the opening unacceptably. What is needed is a means of directing the jet streams beyond the edge of the nozzle carrier.

Yet another aspect of the problem solved by the invention is that both personnel and equipment must get access to the workface. For instance, hydro-demolition techniques cannot be used to remove metal rebar that is normally embedded in concrete walls. Consequently, as the hydro-demolition process moves deeper into the workface, it is necessary to periodically suspend hydro-demolition activity in order to cut exposed rebar out of the way so deeper layers of concrete can be accessed and removed. Even when automated hydro-demolition techniques are used to remove the concrete, removal of the rebar must be done manually with torches or other metal cutting equipment. Other tasks ancillary to removing the concrete, such as inspecting the workface and monitoring progress, must also be done right at the workface. Currently, this means that the hydro-demolition apparatus must be removed from the vicinity of the work-surface so that the rebar cutters and other ancillary workers can gain access to the workface.

This aspect of the problem is exacerbated by the fact that the workface is often a considerable distance off of the ground. For instance, when a nuclear reactor is being removed from a concrete nuclear reactor housing, the workface where the housing wall is being breached may be thirty-feet or more above the ground. It is therefore necessary for the workers removing the rebar or performing other ancillary tasks to be lifted up to the workface once the hydro-demolition machinery has been removed from the vicinity of the workface. This presently necessitates the use of a "cherry-picker" or other type of lift for lifting the ancillary workers, which, in turn, necessitates not just additional expense of engaging a lift, but also lost time in getting the hydro-demolition machinery out of the way, getting the lift in position to lift the workers, moving the lift out of the way again once the ancillary workers have completed their tasks, and re-positioning the hydro-demolition machinery.

It would be a very significant advance in the field of vertical hydro-demolition, and it is an objective of this invention, to provide a hydro-demolition machine having a static support-frame that is set into position adjacent a workface and is operable to lift both hydro-demolition equipment and personnel to work on an elevated workface without having to engage separate lifts and without having to reposition the support-frame once it is in position.

BRIEF SUMMARY OF THE INVENTION

The present invention provides a hydro-demolition machine for removing the constituent material from a workface. The hydro-demolition machine has a stand-alone support-frame placed at the workface. The support-frame is static in the sense that once it is put into place, it is not necessary to move it in order to carry out the hydro-demolition process. Optionally, the support-frame may be placed on and attached to an anchor platform. A carriage ("carriage assembly") is movably attached to the support-frame so that the carriage is operable to be raised and lowered along the workface. A carriage lift mechanism ("transporting assembly") is provided to raise and lower the carriage. At least one nozzle is mounted on the carriage, preferably by way of a nozzle carrier. A carrier drive mechanism ("nozzle driving assembly") is provided to move the nozzle carrier back and forth along the length of the carriage. Each nozzle is supplied with high-pressure erosive material that forms a jet stream emitted by the nozzle. The preferred erosive material is water. Also optionally included are nozzle adjusters such as a means for yawing nozzles about a vertical axis and means for rotating the nozzles about a longitudinal axis so that nozzle jets can be directed beyond the sides of the nozzle carrier. In one embodiment the nozzle adjuster is coupled between the nozzle and the nozzle assembly. The hydro-demolition machine optionally incorporates a work platform for lifting and lowering workers along the workface. The work platform has a safety railing and is mounted directly or indirectly to the support-frame such that the work platform can be raised and lowered along the workface by means of a raising and lowering mechanism. In a preferred embodiment the work platform is attached to the carriage and a single lift mechanism is used to raise and lower both the carriage and the work platform. The lift mechanisms and the carrier drive mechanism can be implemented by known technology including motor driven lead screw mechanisms, chain and sprocket mechanisms, belt and pulley mechanisms, and rack and pinion mechanisms.

BRIEF DESCRIPTION OF THE DRAWINGS

In the drawings identical reference numbers are employed to identify identical elements. In order to facilitate location of elements in the figures, the two right-most digits of each reference numeral refer to the figure in which the reference numeral first appears.

The sizes and relative positions of the elements in the drawings are not necessarily to scale. For example, thickness is generally not drawn to scale and is enlarged to promote comprehension.

DETAILED DESCRIPTION OF THE INVENTION

Figure 1:
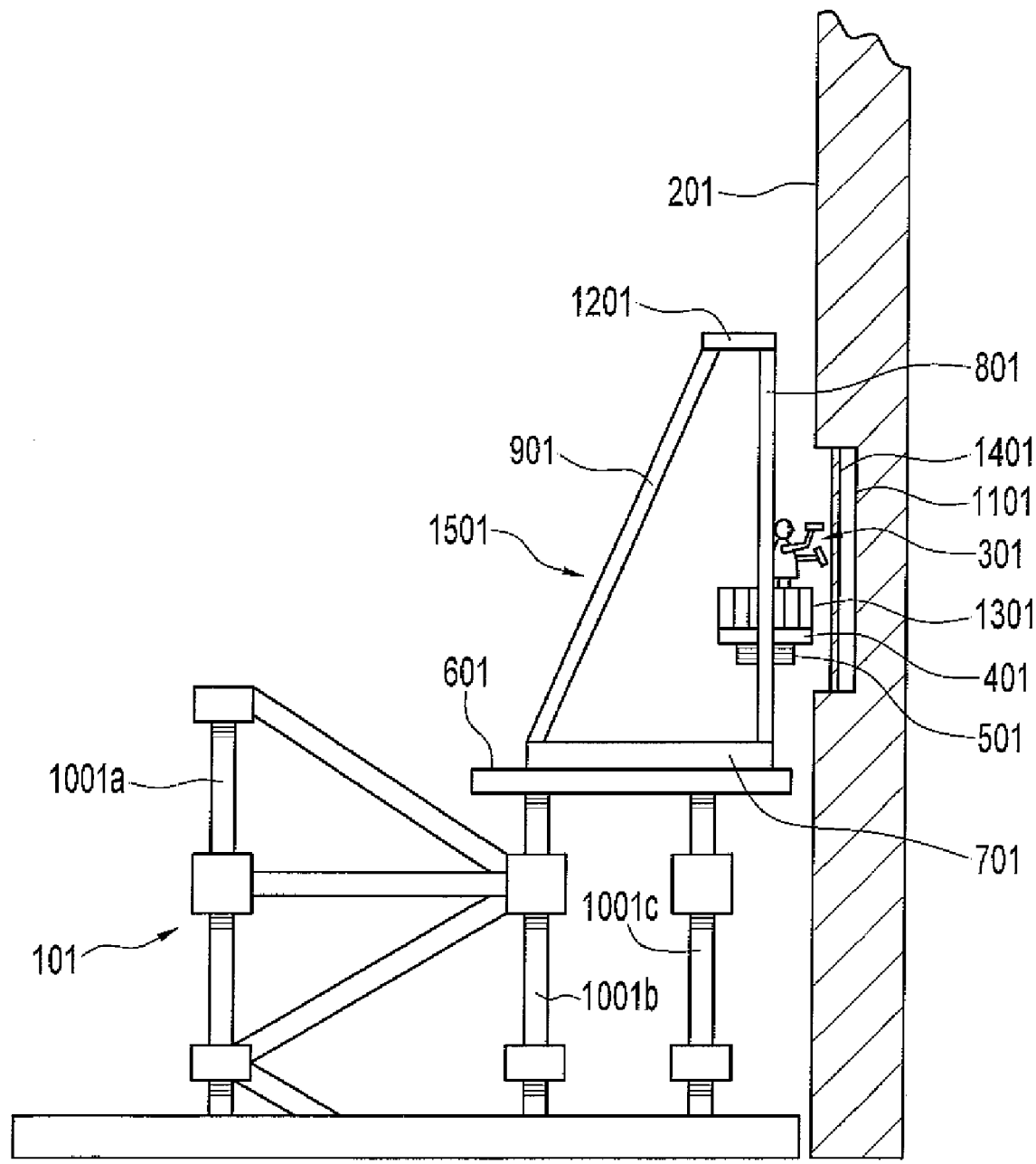
FIG. 1 is side elevation of the invention placed in position adjacent a wall shown in cross-section.

The inventive concepts and novel features of the invention are described here with reference to specific preferred embodiments of the invention. These embodiments represent the best mode currently known to us for practicing the invention. Although the steps and elements of the invention, as well as their structural and functional relationships, may be easily comprehended with respect to the preferred embodiments disclosed herein, it is to be noted that these disclosures are representative of many possible embodiments that fall within the scope of the claims and that incorporate the inventive concepts of our invention Structural Elements and Limitations FIG. 1 shows a side elevation of the invention in place adjacent a concrete wall 201, which is shown in cross-section. The wall is being breached by cutting an opening through the wall with hydro-demolition techniques. The workface 1101 is shown in progress with the opening about half-way through the wall. Exposed rebar that has not yet been removed is indicated as 1401.

The invention includes a free-standing, static, support-frame 1501. Visible in FIG. 1 is the end of the support-frame, which comprises vertical member 801, top member 1201, angled member 901, and bottom member 701. Depending on the size of the support-frame, top member 1201 can be optionally dispensed with so that angled member 901 connects directly to vertical member 801. The opposite end of the support-frame is similarly constructed. A plurality of horizontal members (not shown in FIG. 1) connect the two ends.

The support-frame 1501 is lifted into position adjacent wall 201 by a crane, which positions the support-frame either directly on the ground or, more preferably, on an anchor platform 101. Once the support-frame 1501 has been put in position it is generally neither necessary nor advisable to move it until the job is completed. The support-frame 1501 is massive enough that it remains fixed and stable even in winds of high enough velocity to prevent cherry-picker type devices from being used. If necessary, the support-frame 1501 can be bolted to the anchor platform. The anchor platform varies in size and configuration according to the support-frame 1501 and the requirements of a particular job. The anchor platform generally includes a plurality of support columns 1001*a-c* and a horizontal surface 601 upon which the support-frame is mounted.

Carriage 501 spans the width of the support-frame 1501. The carriage is operatively connected to the vertical members of the support-frame so that the carriage can be raised or lowered by a lift mechanism, as discussed below. The carriage may be as simple as a bar movably supported at its ends by the support-frame and adapted to allow a nozzle carrier to move along it's length.

Figure 2:
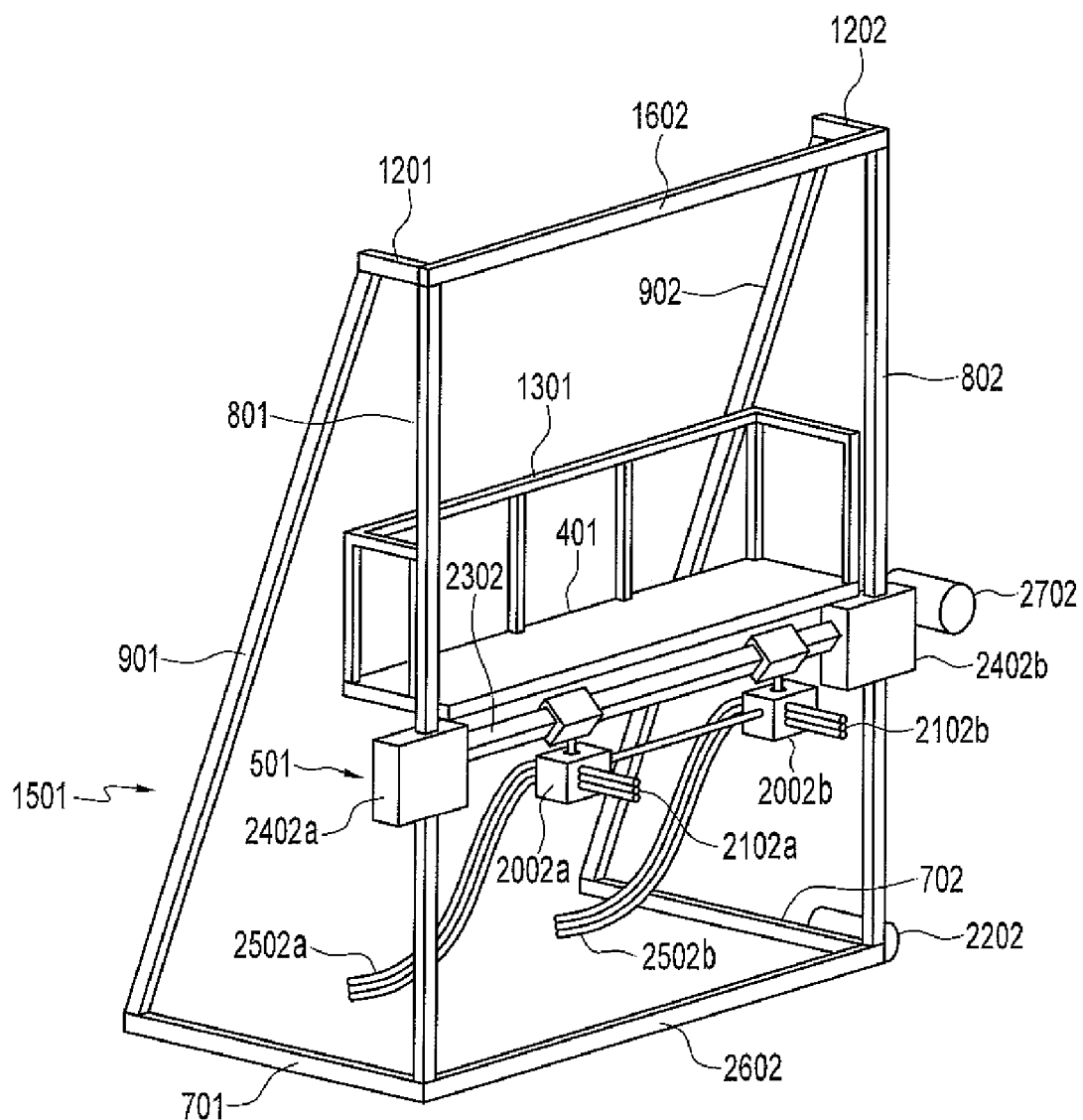
FIG. 2 is a perspective view of the invention.

Optionally, a work platform 401 is mounted on the carriage, providing a flat elevator work-surface upon which one or more ancillary workers 301 stand to gain access the workface. The work platform is movably connected to the support-frame such that it can be raised and lowered on the support-frame 1501 along the workface. In one embodiment, the elongate work platform is attached to the carriage by bolting the ends of the work platform to end blocks 2402*a*, 2402*b* (FIG. 2). The precise means of connecting the work platform to the support-frame is not critical, and a number of means can be easily envisioned. The primary advantage of mounting the work platform on the carriage is that only a single lift mechanism is required to raise and lower both the work platform and the carriage. However, the work platform and carriage can be attached to the support-frame independently, including means for raising and lowering each element independently of the other. A safety railing 1301 for the work platform is provided.

Referring to FIG. 2, the carriage includes a bar 2302, the ends of which are received by end blocks 2402*a*, 2402*b*. The end blocks are moveably connected to support-frame vertical members 801, 802 by means of tracks or gear-racks (not visible) on the vertical members. These tracks or racks permit the end blocks to travel up and down the length of the vertical members. Thus, the carriage and work platform are raised and lowered as a unit.

From this disclosure it will be evident to those skilled in the field, that a variety of devices can be potentially employed as lift mechanisms to raise and lower the carriage and the work platform. FIG. 2 shows one preferred embodiment in which an actuator, electric motor 2202, turns a sprocket that engages a chain located in vertical member 802. The embodiment shown FIG. 2 employs just one such chain/sprocket lift mechanism, but a second lift mechanism can be employed at the opposite end of the support-frame according to the requirements of the job. Depending on the direction of rotation of the output shaft of motor 2202, carriage 501 is raised or lowered along the length of the vertical members 801 and 802.

One or more nozzle carriers 2002*a*, 2002*b* are movably attached to the bar. FIG. 2 shows two such nozzle carriers, but the scope of the invention contemplates both fewer and more, depending on the width and geometry of the workface. The function of the nozzle carriers is to provide a means for connecting either individual nozzles or assemblies of multiple nozzles 2102*a*, 2102*b* to the carriage in a manner that permits movement and alignment of the nozzles as described below.

Figure 3:
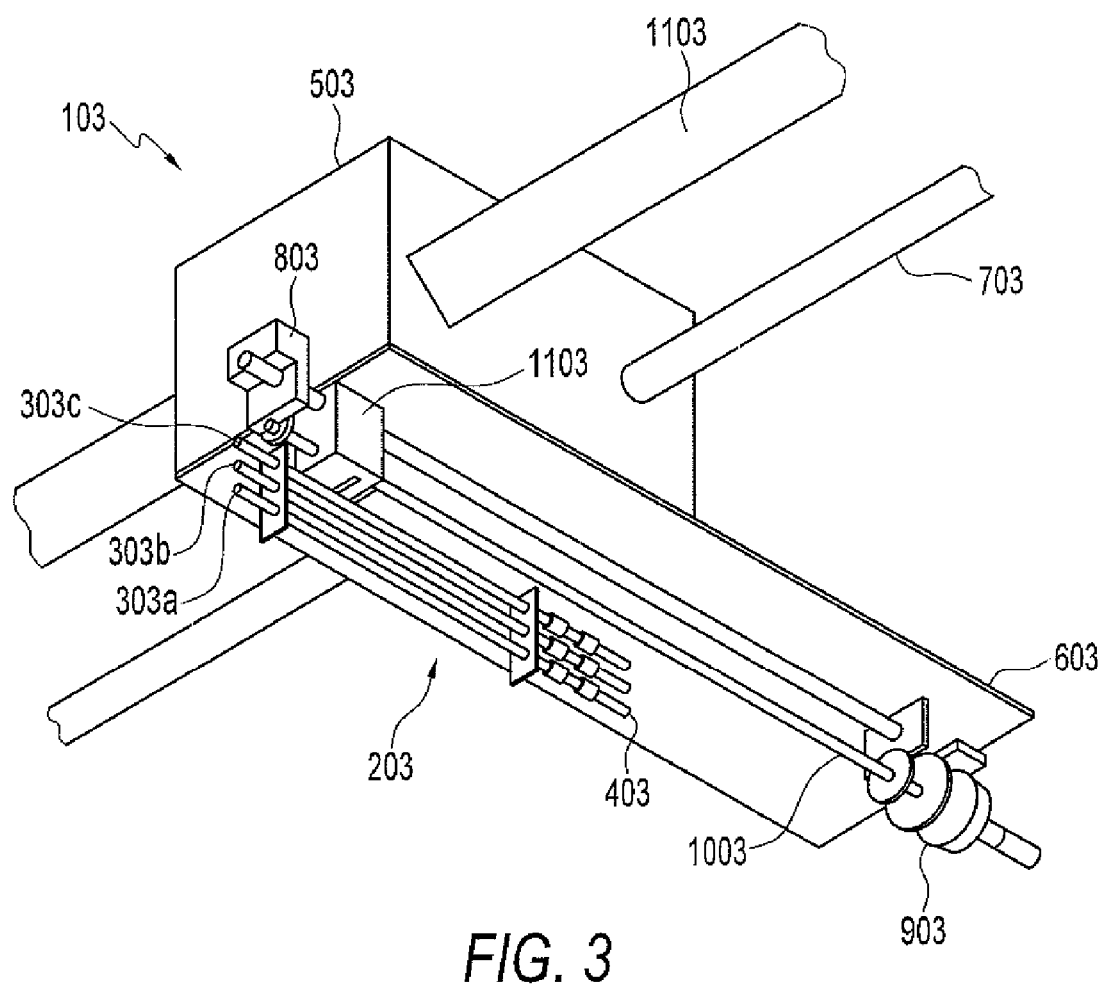
FIG. 3 is a perspective view of a nozzle carrier and a nozzle assembly.

FIG. 3 shows a preferred embodiment of a nozzle carrier 103 and a nozzle assembly 203. Nozzle carrier 103 is moveably mounted on bar 1103 by means of carrier block 503, through which the bar passes. Nozzle assembly 203 is connected to the carrier block my means of plate 603. The nozzle carrier is driven back and forth along the length of the bar by means of threaded carrier lead screw 703, which engages a threaded bore in carriage block 503. The lead screw is turned by an actuator, such as the electric motor 2702 shown in FIG. 2.

The nozzle assembly shown in FIG. 3 has three nozzles 303*a*, 303*b*, 303*c*, although an assembly could have fewer or more nozzles depending on the requirements of the particular job. Bracket 803 is provided for connecting the nozzle assembly to the carrier block. At the proximal end of each nozzle is a pressure fitting 403 that mates with a pressure fitting on a high-pressure hose (not shown) supplying erosive material under high pressure to the nozzle. When supplied with the high-pressure erosive material, the nozzle emits a jet stream of the erosive material and directs the jet stream against the workface. The preferred erosive material is water, but from the present disclosure those skilled in the invention can, without undue experimentation, adapt the preferred embodiment so as to employ any suitable erosive material. When multiple nozzles are carried by a nozzle carrier, the hoses supplying the nozzles of a single carrier may be conveniently tied together to form a plexus, as shown in FIG. 2, 2502*a*, 2502*b*.

It is desirable in view of the objectives of the invention that the nozzles be adjustable longitudinally along their long or longitudinal axes so that the nozzles are adjustable to move toward and away from the workface. This permits the nozzles to be positioned an optimal distance from the workface to deliver a jet stream against the workface with sufficient force to remove the constituent material even while the workface is receding from the surface of the wall.

FIG. 3 shows one preferred embodiment for providing this longitudinal adjustability. A hydraulic actuator 903 is coupled to threaded lead screw 1003, which is rotatably received by threads in drive block 1103. The nozzle assembly 203 is connected to and carried by drive block 503; hence, the nozzles are adjustable along their longitudinal axis by controlling actuator 903.

Figure 4:
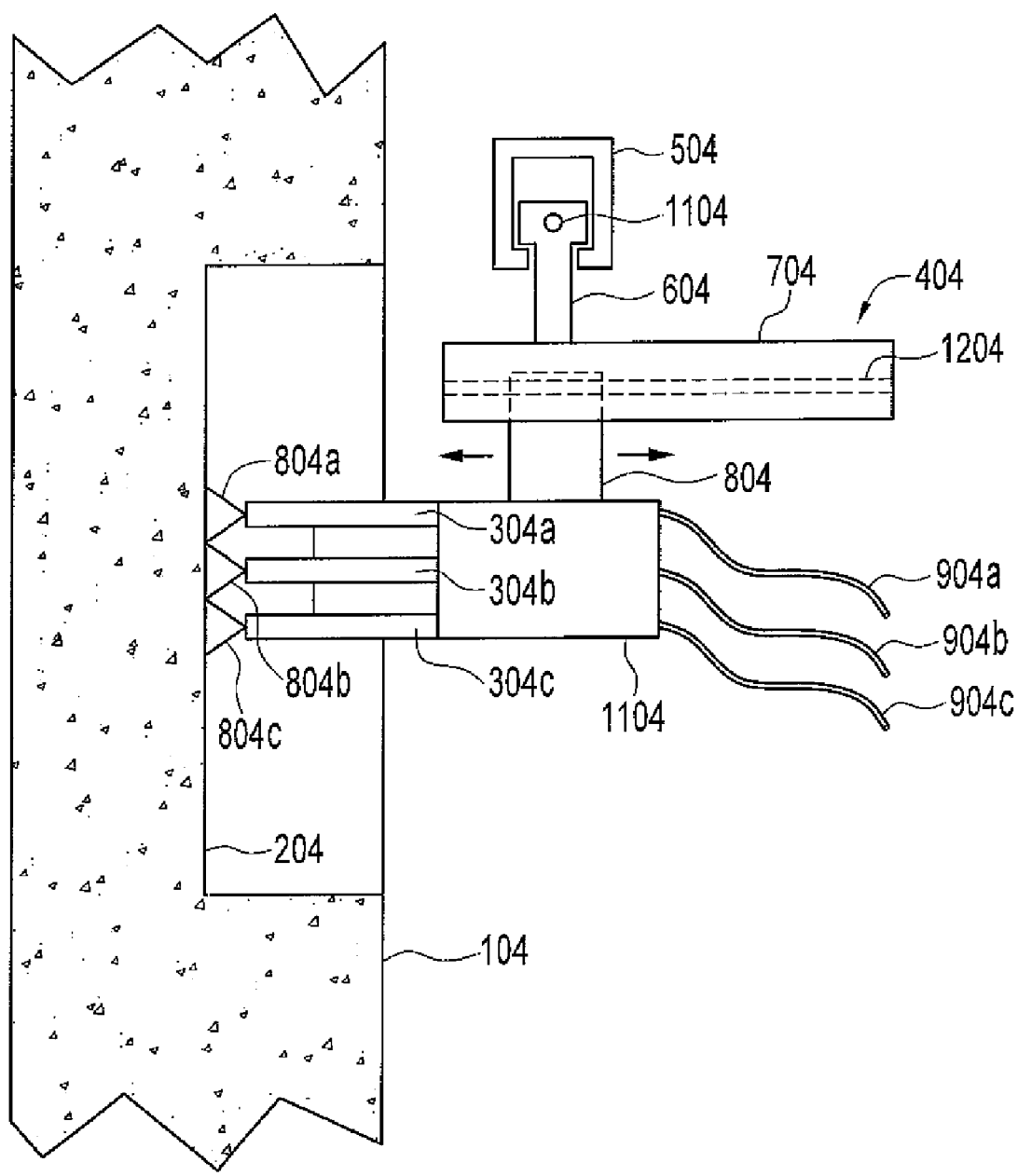
FIG. 4 is a side elevation of nozzle carrier including structure for adjusting a nozzle assembly along its longitudinal axis.

FIG. 4 shows an alternative preferred embodiment for effectuating large longitudinal movements of nozzles required when breeching thick walls. Wall 104 is shown partially breeched. The workface 204 is shown cut about halfway through the wall. Nozzle carrier 404 comprises a nozzle block 1104 that holds a nozzle assembly of three nozzles 304 *a-c* that are directing jet streams 804 *a-c* against the workface. A supply of high-pressure water is connected to the nozzles by means of high-pressure hoses 904 *a-c*. The nozzle block is suspended from extension arm 704 by means of connector 804. The extension arm is movably connected to carriage 504 by means of rider 604. The carriage of this embodiment is a hollow steel beam, which is shown in cross-section in FIG. 4.

The nozzle carrier 404 moves back and forth across the workface (which is to say in and out of the plane of the figure page) by means of rider 604 being driven back and forth along the length of the carriage 504 by a drive means. The drive means shown is threaded lead screw 1004 which engages a threaded orifice of rider 604 and moves the rider when the lead screw is rotated by an actuator, as described above. Rack/pinion, chain/sprocket, and belt/pulley drives are examples of alternative drive means.

As the workface is eroded from right to left in FIG. 4, it is necessary to extend the nozzles further and further into the opening by adjusting the nozzles forward along their longitudinal axes. This is accomplished by a drive mechanism housed within extension arm 704. In the present embodiment connector piece 804 rides to and fro along the extension arm in a manner analogous to the way rider piece 604 rides along the carriage 504, described above. Threaded lead screw 1204 housed within extension arm 704 engages a threaded orifice in connector piece 604. Lead screw 1204 is rotated by an actuator (not shown) thereby moving the nozzle block 1104 and nozzles 304 *a-c* toward or away from the workface 104. Rack/pinion, chain/sprocket, and belt/pulley drives are examples of alternative drive means.

It will be appreciated that choosing appropriate lengths for the nozzles and the extension arm is critical for the embodiment shown in FIG. 4 to work properly. Because carriage 504 is attached to the support-frame, which is immobile once it is in position, the distance between the carriage and the outer surface of the wall does not change during the operation. Consequently, the lengths of the nozzles and the length of the extension arm must be chosen such that when the nozzles are fully retracted (i.e., to the right in FIG. 4) the nozzle tips are free of the wall surface. Likewise, the length of the nozzles combined with the distance of travel of the nozzle block 1104 along the extension arm 704 must be sufficient to allow the nozzles to be extended far enough into the opening to achieve the intended results.

The foregoing disclosures describe embodiments in which the angle of the jet stream with respect to the carriage remains fixed at 90 degrees. This means that the jet streams do not extend beyond the edge of the nozzle carrier. If a deep opening is cut in or through the workface, such fixed-angle embodiments have a number of disadvantages. For instance, when working along the sides of a deep opening, as the nozzle assembly is advanced into the opening there comes a point at which the sidewalls of the opening prevent the nozzle carrier from moving sideways.

Figure 5:
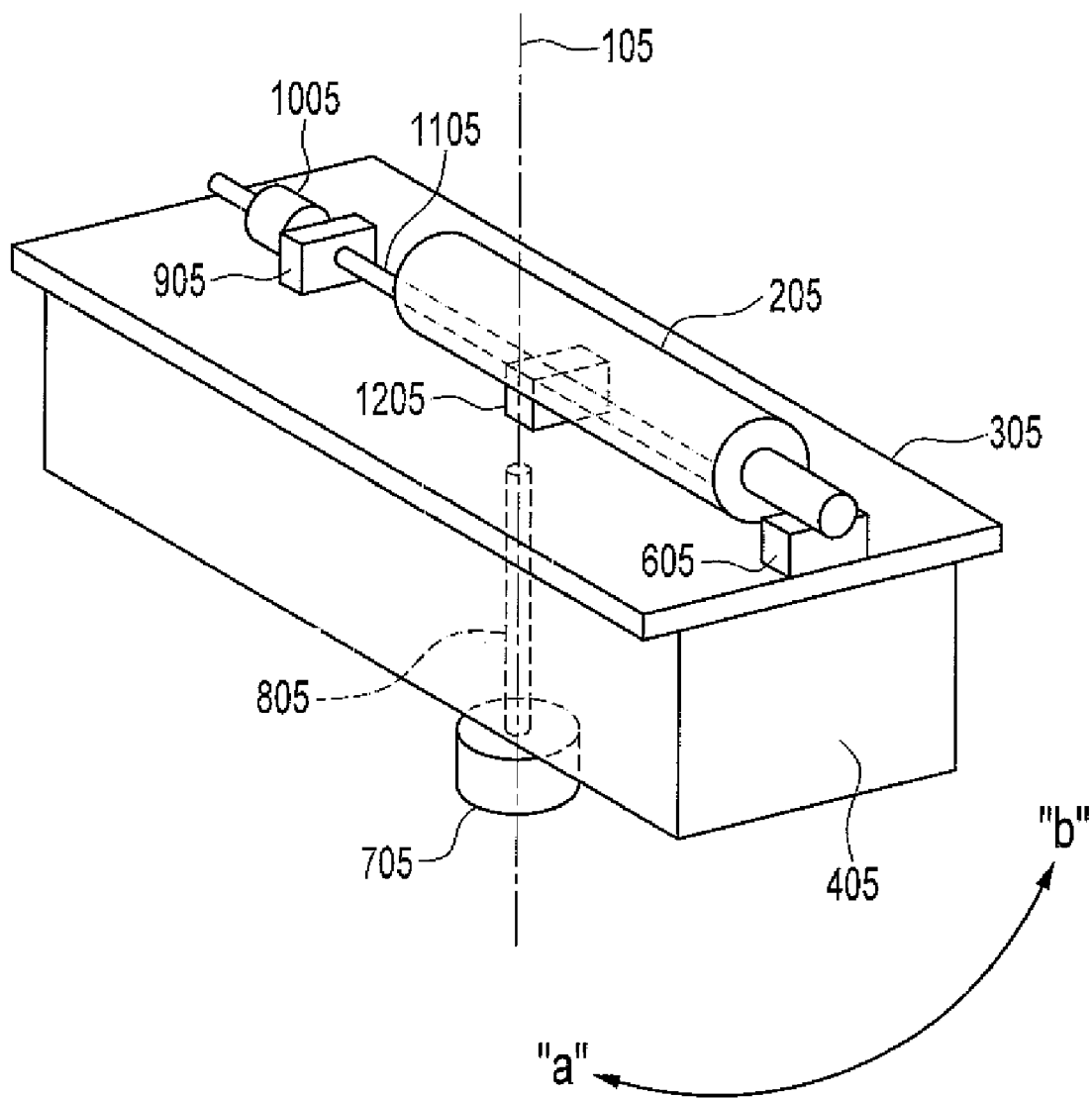
FIG. 5 is a perspective view of a nozzle carrier and means for yawing the nozzle carrier about the vertical axis.

FIG. 5, demonstrates this difficulty and shows a preferred embodiment of a nozzle carrier that overcomes it. Shown in FIG. 5 is a nozzle carrier comprising a nozzle 205 mounted on a carrier block 405 by means of a plate 305, as previously described. Also shown is a rotating actuator 1005, a threaded lead screw 1105, and threaded drive blocks 605 and 905 that receive the threaded lead screw. The lead screw passes through threaded drive plate 1205, which is connected to the body of nozzle 205. As actuator 1005 rotates, the nozzle is carried forward or backward along its longitudinal axis.

The nozzle carrier has a vertical axis of rotation 105 about which the carrier yaws so that the jet stream prescribes an arc shown as "a"-"b". This yawing is effectuated by a rotating actuator, such as a stepper motor 705 that has a shaft 805 coincident with the vertical axis of rotation and immovably fixed in the nozzle block 405. As the shaft is made to turn by the stepper motor, the nozzle yaws about the vertical axis of rotation. Consequently, as the nozzle carrier moves toward a side of the opening, the carrier yaws towards that side, thereby directing the jet stream against the side and cutting away the side before the carriage's movement is interfered with. By cutting the sides of the workface in this manner, the sides of the opening are cleanly and evenly cut away and the nozzle carriage can be extended into deep openings.

Figure 6:
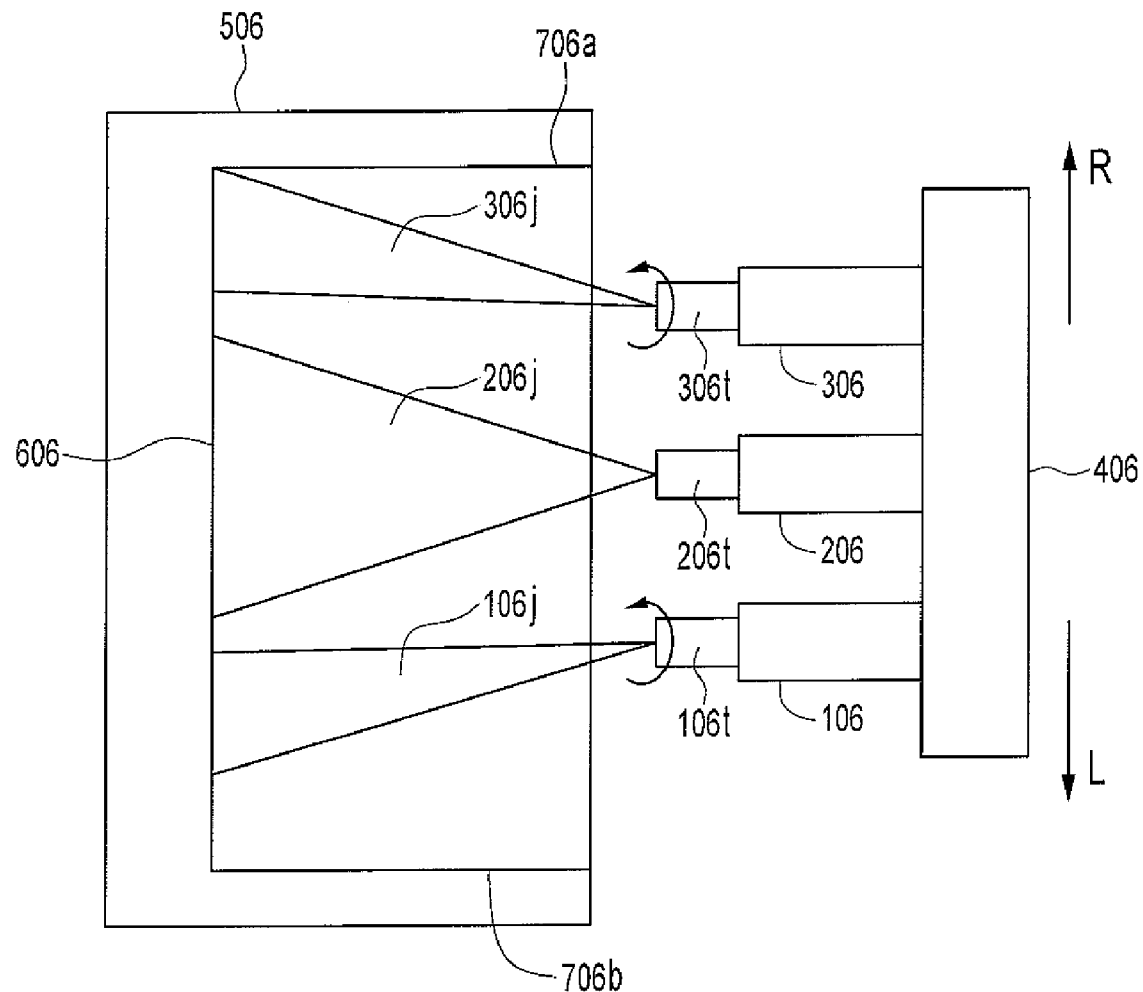
FIG. 6 is a top elevation of a nozzle carrier moving nozzles back and forth across a workface.

Additionally, or alternatively, depending on the application, it may be useful to direct the jet stream at an angle to the nozzle's longitudinal axis and then rotate the nozzle, thereby causing an annular jet stream to be emitted that extends beyond the edge of the nozzle carrier. FIG. 6 shows a top elevation of a wall 506 being breeched by the invention wherein the workface 606 is moving deeper into the wall as the hydro-demolition process proceeds. Nozzles 106, 206, and 306 form a nozzle assembly, which is carried back and forth from right ("R") to left ("L") along the workface by nozzle carrier 406, as indicated by the arrows. The figure shows the nozzle carrier at its right-most extreme position, adjacent the right sidewall 706 of the opening.

The nozzles have nozzle tips, 106*t*, 206*t*, and 306*t*, which emit jet streams 106*j*, 206*j*, and 306*j*, respectively. The longitudinal axis of tip 206*t* coincides with the longitudinal axis of nozzle 206. Jet stream 206*j* is therefore substantially symmetrical about the longitudinal axis. Nozzle tips 106*t* and 306*t* have axes that are angled with respect to their nozzle longitudinal axes. This produces jet streams that are off-set from the longitudinal axis, and these jet streams inscribe annuli when the nozzles are rotated about the longitudinal axes. The desirable consequence of these annular jet streams 106*j*, 306*j* is that they are wider than the straight jet stream 206*j*. Consequently, the wider jet streams reach beyond the edge of the nozzle carrier 406 thereby making the opening wide enough to accommodate the nozzle carrier.

Functional and Operational Features

Referring to FIG. 1 and FIG. 2, the manner of using the invention and its operational features can be easily appreciated.

Prior to moving the invention into position, a workface is mapped on the outer surface of the wall to be breached, and the anchor platform 101 is positioned adjacent the wall so as to insure access to the workface. Support-frame 1501 is then lifted onto the anchor platform 101 with the vertical members 801 facing the wall and the angled members 901 facing away from the wall, thereby orienting the support-frame to access the workface.

One or more nozzles are mounted on the carriage 501 either directly or, preferably, by a nozzle carrier, such as shown in FIG. 4. The carriage and the work platform 401 are mounted to the support-frame. These assembly steps may be done either prior to or after lifting the support-frame onto the anchor platform, depending on the application and lifting equipment available. In some situations it is desirable to affix the support-frame to the anchor platform. This is done by conventional nut and bolt connectors. In other situations the mass of the support-frame is sufficient to maintain it in a fixed and stable position.

A high-pressure water supply is connected to the nozzles 2102 by means of high-pressure hoses 2502. Using the carriage lift mechanism 2202, the carriage is lifted to a convenient starting point on the workface. Then the nozzles are adjusted sufficiently towards or away from the wall and aligned so that they are at an optimum distance and angle for attacking the concrete. Valves controlling the high-pressure water are opened to permit the high-pressure water to pass through the hoses and supply the nozzles. The nozzles thereby produce jet streams directed at the workface. The nozzles move to and fro along the carriage and, hence, back and forth across the workface from one side to the opposing side, thereby eroding the concrete in a linear swath. As the nozzle carrier approaches a sidewall of the opening being cut, the nozzle carrier closest to the side-wall being approached is yawed toward that side, thereby directing the jet stream against the sidewall before the nozzle carrier reaches the side. The nozzle carrier then reverses direction and carries the nozzles back across the workface to the other side where the nearest nozzles to that side are yawed toward that side. Alternatively, the outer nozzles are provided with tips that produce an angular jet stream and the nozzles are rotated thereby allowing the jet stream erode the side walls of the opening.

These lateral passes are repeated for a desired number of iterations, thereby producing a lateral swath of eroded surface across the workface. Then the carriage is lifted or lowered up or down the support-frame incrementally to a new level on the see tif 108 workface where the process is repeated, thereby producing an adjacent lateral swath of eroded surface and increasing the total width of the lateral swath of the eroded surface. The debris produced by the process falls down the face of the wall and accumulates for the most part under the anchor platform where it does not interfere with the equipment or the on-going hydro-demolition process.

If the wall is of the type having embedded rebar support, this process is reiterated until a sufficient thickness of the wall has been removed to expose the rebar. When enough rebar has been exposed to prevent further hydro-demolition, the carrier is lowered and one or more workers with rebar cutting equipment mount the work platform 401. The workers are then lifted to the workface where they cut away the exposed rebar with the rebar cutting equipment. When they have finished clearing rebar, the workers are lowered, they dismount the work platform, and the carrier is raised again so that concrete down to the next course of rebar can be removed. Thus, it is not necessary to re-position the hydro-demolition equipment, or even remove the nozzle carriers from the carriage, during the rebar cutting process.

The foregoing steps are repeated until the wall is breeched or the desired thickness of concrete has been removed.

Summary

As will be appreciated from the preceding disclosure, the invention enjoys many and diverse applications. The machine of the invention and its method of use are capable of producing openings with well delimited and square sides, even when deconstructing thick walls. The invention can be used to completely breech walls or to scarify just the surface of walls. By incorporating the elevator work platform in the invention, it is not necessary to move the hydro-demolition machine out of the way in order for workers to gain access to exposed rebar. The workers simply mount the work platform and are lifted to the workface. Thus, the invention dispenses with a need to engage separate lifting equipment for lifting the workers.

From the foregoing description, the novelty, utility, and means of using our invention will be readily apprehended. It is to be understood that our invention is not limited to the embodiments disclosed above but encompasses any and all embodiments lying within the scope of the following claims. The metes and bounds of our invention are to be ascertained by referring to the claims in conjunction with the figures and the foregoing disclosures.

By means of summary, many of the features of the invention can be appreciated with reference to the following enumerated statements:

Statement 1: The invention includes a machine for deconstructing a wall, the machine comprising: a static support-frame; a carriage supported by the static support-frame, the carriage movable to be raised and lowered on the support-frame along a workface of the wall; at least one carriage lift mechanism for raising and lowering the carriage along the workface; at least one nozzle carrier mounted on the carriage, the nozzle carrier adapted to move back and forth along the length of the carriage from one edge of the workface to an opposing edge of the workface; a carrier drive mechanism for moving the nozzle carrier back and forth along the length of the carriage; a high-pressure supply of erosive material; and, at least one nozzle carried by the nozzle carrier, wherein the nozzle is in communication with the high-pressure supply of erosive material so that the erosive material passes through the nozzle, wherein the nozzle is adapted to emit a jet stream of the erosive material against the workface when the erosive material passes through the nozzle, thereby removing constituent material from the workforce.

Statement 2: The invention includes the machine of Statement 1 further comprising means for moving the nozzle toward and away from the workface.

Statement 3: The invention includes the machine of Statement 2 wherein the means for moving the nozzle toward and away from the workface comprises a drive mechanism having an actuator chosen from the group consisting of: a rack and pinion mechanism; a chain and sprocket mechanism; a lead screw mechanism; and, a belt and pulley mechanism.

Statement 4: The invention includes the machine of Statement 1 further comprising means for yawing the nozzle about a vertical axis of the nozzle.

Statement 5: The invention includes the machine of Statement 1 wherein the carriage comprises an elongate bar, the bar having a first bar end and a second bar end, wherein the bar is oriented substantially horizontally and wherein the nozzle carrier is movably mounted on the bar to move back and forth along the length of the bar.

Statement 6: The invention includes the machine of Statement 5 wherein the carriage further comprises a first end block that receives the first bar end; and, a second end block that receives the second bar end, wherein the first end block and the second end block are movably coupled to the support-frame to move up and down the support-frame.

Statement 7: The machine of Statement 1 further comprising a work platform movably mounted on the static support-frame; and, a work platform lift mechanism for raising and lowering the work platform on the support-frame up and down along the workface.

Statement 8: The invention includes the machine of Statement 7 wherein the carriage lift mechanism and the work platform lift mechanism are the same.

Statement 9: The invention includes the machine of Statement 7 wherein the work platform is mounted on the support-frame by being mounted to the carriage.

Statement 10: The invention includes the machine of Statement 9 wherein the work platform lift mechanism comprises an actuator coupled to a mechanism chosen from the group consisting of: a rack and pinion mechanism, a chain and sprocket mechanism, a lead screw mechanism, and a belt and pulley mechanism.

Statement 11: The invention includes the machine of Statement 1 wherein the carriage lift mechanism comprises an actuator coupled to a mechanism chosen from the group consisting of: a rack and pinion mechanism, a chain and sprocket mechanism, a lead screw mechanism, and a belt and pulley mechanism.

Statement 12: The invention includes the machine of Statement 1 further comprising an anchor platform that supports the static support-frame.

Statement 13: The invention includes the machine of Statement 1 wherein the erosive material is water.

Statement 14: The invention includes a method of deconstructing a wall, the method comprising the steps of: (a) placing a static support-frame adjacent the wall, the support-frame being oriented to access a workface of the wall; (b) mounting a carriage to the support-frame, the carriage being adapted to be raised and lowered on the support-frame along the workface; (c) mounting at least one nozzle on the carriage of Step (b), the nozzle being adapted to move back and forth along the length of the carriage, from one side of the workface to an opposing side; (d) connecting a supply of high-pressure erosive material to the nozzle of Step (c); (e) causing the high-pressure erosive material of Step (d) to pass through the nozzle of Step (c), thereby forming a jet stream of erosive material; (f) aligning the nozzle of Step (c) so that jet stream of Step (e) erodes the surface of the workface; (g) moving the nozzle of Step (c) along the carriage of Step (b) from one side of the workface to an opposing side of the workface, thereby producing a swath of eroded surface on the workface; (h)

moving the carriage of Step (b) up or down on the support-frame to a higher position or lower position on the workface; and, (i) repeating Steps (e) through (h) for a sufficient number of iterations to remove a desired amount of the constituent material from the workface.

Statement 15: The invention includes the method of Statement 14 wherein Step (c) is performed by mounting the nozzle on a nozzle carrier, wherein the nozzle carrier is movably attached to the carriage to move back and forth along the length of the carriage, from one side of the workface to an opposing side.

Statement 16: The invention includes the method of Statement 14 comprising the further steps of: (k) connecting a work platform to the support-frame of Step (a), wherein the work platform is adapted to be raised and lowered on the support-frame; and, (l) lifting rebar cutting equipment to the workface by means of the work platform of Step (k); and wherein Step (i) further comprises at least one iteration of the step of removing exposed rebar within the workface with the rebar cutting equipment of Step (l).

Statement 17: The invention includes the method of Statement 14 wherein Step (a) further comprises the steps of: (a1) placing an anchor platform adjacent the wall; and, (a2) placing the support-frame of Step (a) on the anchor platform of Step (a1).

Statement 18: The invention includes the method of Statement 14 wherein the erosive material of Step (d) is water.

Statement 19: The invention includes an apparatus for removing concrete from a wall of concrete, comprising: (a) a frame having a front region adjacent to the wall and supported by a platform; (b) an elongated carriage assembly coupled to the frame proximate a front region of the frame, the elongated carriage assembly extending across the frame; (c) a nozzle assembly mounted on the carriage assembly and operative to move along the carriage assembly; (d) a nozzle driving assembly coupled to the nozzle assembly and operative to drive the nozzle assembly along the carriage assembly; (e) a nozzle on the nozzle assembly operative to emit a jet stream against the wall of sufficient velocity to remove concrete from the wall; (f) a nozzle adjuster coupled between the nozzle and the nozzle assembly and operative to adjust the position of the nozzle relative to the wall each time the nozzle has traversed the carriage assembly a predetermined number of cycles; and, (g) a lift mechanism coupled to and operative to raise and lower the elongated carriage assembly along the front region.

What is claimed:

1. A machine for deconstructing a wall, said machine comprising:
    a. a static support-frame;
    b. a carriage supported by said static support-frame, said carriage movable to be raised and lowered on said static support-frame along a workface of the wall;
    c. at least one carriage lift mechanism for raising and lowering said carriage along the workface;
    d. at least one nozzle carrier mounted on said carriage, said nozzle carrier adapted to move back and forth along the length of said carriage from one edge of the workface to an opposing edge of the workface;
    e. a carrier drive mechanism for moving said nozzle carrier back and forth along the length of said carriage;
    f. a high-pressure supply of erosive material;
    g. at least one nozzle carried by said nozzle carrier, wherein said nozzle is in communication with said high-pressure supply of erosive material so that the erosive material passes through said nozzle; and,
    h. means for yawing said nozzle about a vertical axis of said nozzle, wherein said nozzle is adapted to emit a jet stream of the erosive material against the workface when the erosive material passes through said nozzle, thereby removing constituent material from the workface.

2. The machine of claim 1 further comprising means for moving said nozzle toward and away from the workface.

3. The machine of claim 2 wherein said means for moving said nozzle toward and away from the workface comprises a drive mechanism having an actuator chosen from the group consisting of: a rack and pinion mechanism; a chain and sprocket mechanism; a lead screw mechanism; and, a belt and pulley mechanism.

4. A method of deconstructing a wall, said method comprising the steps of:
    (a) placing a static support-frame adjacent the wall, the static support-frame being oriented to access a workface of the wall;
    (b) mounting a carriage to the static support-frame, the carriage being adapted to be raised and lowered on the static support-frame along the workface;
    (c) mounting at least one nozzle on the carriage of Step (b), the nozzle being adapted to move back and forth along the length of the carriage, from one side of the workface to an opposing side;
    (d) connecting a work platform to the static support-frame of Step (a), wherein the work platform is adapted to be raised and lowered on the static support-frame;
    (e) using the work platform of Step (d) to lift rebar cutting equipment to the workface;
    (f) connecting a supply of high-pressure erosive material to the nozzle of Step (c);
    (g) causing the high-pressure erosive material of Step (f) to pass through the nozzle of Step (c), thereby forming a jet stream of erosive material;
    (h) aligning the nozzle of Step (c) so that the jet stream of Step (g) erodes the surface of the workface;
    (j) moving the nozzle of Step (c) along the carriage of Step (b) from one side of the workface to an opposing side of the workface, thereby producing a swath of eroded surface on the workface;
    (k) using the rebar cutting equipment of Step (e) to remove exposed rebar within the workface;
    (l) moving the carriage of Step (b) up or down on the static support-frame to a higher position or lower position on the workface; and,
    (m) repeating Steps (g) through (l) for a sufficient number of iterations to remove a desired amount of the constituent material from the workface.

5. The method of claim 4 wherein Step (a) comprises the steps of:
    (a1) placing an anchor platform adjacent the wall; and,
    (a2) placing the support-frame on the anchor platform of Step (a1).

6. A machine for deconstructing a wall, said machine comprising:
    a. a static support-frame;
    b. a carriage supported by said static support-frame, said carriage movable to be raised and lowered on said static support-frame along a workface of the wall, wherein said carriage comprises:
        i. an elongate bar, said elongate bar having a first bar end and a second bar end, wherein said elongate bar is oriented substantially horizontally;
        ii. a first end block that receives said first bar end; and,
        iii. a second end block that receives said second bar end, wherein said first end block and said second end block are movably coupled to said static support-frame to move said carraige up and down said support-frame along the workface;

c. at least one carriage lift mechanism for raising and lowering said carriage along the workface;

d. at least one nozzle carrier movably mounted on said bar to move back and forth along said bar;

e. a carrier drive mechanism for moving said nozzle carrier back and forth along said bar;

f. a high-pressure supply of erosive material; and, g. at least one nozzle carried by said nozzle carrier, wherein said nozzle is in communication with said high-pressure supply of erosive material, wherein said nozzle is adapted to emit a jet stream of the erosive material against the workface when the erosive material passes through said nozzle.

7. The machine of claim 6 further comprising means for moving said nozzle toward and away from the workface.

8. The machine of claim 6 wherein said means for moving said nozzle toward and away from the workface comprises a drive mechanism having an actuator chosen from the group consisting of: a rack and pinion mechanism; a chain and sprocket mechanism; a lead screw mechanism; and, a belt and pulley mechanism.

9. The machine of claim 6 further comprising means for yawing said nozzle about a vertical axis of said nozzle.

10. The machine of claim 6 further comprising:

a. a work platform movably mounted on said static support-frame; and, b. a work platform lift mechanism for raising and lowering said work platform on said support-frame up and down along the workface.

11. The machine of claim 10 wherein said carriage lift mechanism and said work platform lift mechanism are the same.

12. The machine of claim 10 wherein said work platform is mounted on said support-frame by being mounted to said carriage.

13. The machine of claim 12 wherein said work platform lift mechanism comprises an actuator coupled to a mechanism chosen from the group consisting of: a rack and pinion mechanism, a chain and sprocket mechanism, a lead screw mechanism, and a belt and pulley mechanism.

14. The machine of claim 6 wherein said carriage lift mechanism comprises an actuator coupled to a mechanism chosen from the group consisting of: a rack and pinion mechanism, a chain and sprocket mechanism, a lead screw mechanism, and a belt and pulley mechanism.

15. The machine of claim 6 further comprising an anchor platform that supports said static support-frame.

16. The machine of claim 6 wherein the erosive material is water.

17. A method of using the machine of claim 6 to deconstruct a wall, said method comprising the steps of:

(a) placing the static support-frame adjacent the wall, the support-frame being oriented to access a workface of the wall;

(b) connecting a supply of high-pressure erosive material to the nozzle;

(c) causing the high-pressure erosive material of Step (b) to pass through the nozzle, thereby forming a jet stream of erosive material;

(d) aligning the nozzle so that jet stream of Step (c) erodes the surface of the workface;

(e) moving the nozzle from one side of the workface to an opposing side of the workface, thereby producing a swath of eroded surface on the workface;

(f) moving the carriage up or down on the support-frame to a higher position or lower position on the workface; and, (g) repeating Steps (c) through (f) for a sufficient number of iterations to remove a desired amount of the constituent material from the workface.

18. A machine for deconstructing a wall, said machine comprising:

a. a static support-frame;

b. a carriage supported by said static support-frame, said carriage movable to be raised and lowered on said static support-frame along a workface of the wall;

c. a work platform movably mounted on said static support-frame;

d. a lift mechanism for raising and lowering both of said carriage and said work platform along the workface;

e. at least one nozzle carrier mounted on said carriage, said nozzle carrier adapted to move back and forth along the length of said carriage from one edge of the workface to an opposing edge of the workface;

f. a carrier drive mechanism for moving said nozzle carrier back and forth along the length of said carriage;

g. a high-pressure supply of erosive material; and, h. at least one nozzle carried by said nozzle carrier, wherein said nozzle is in communication with said high-pressure supply of erosive material, wherein said nozzle is adapted to emit a jet stream of the erosive material against the workface when the erosive material passes through said nozzle thereby removing constituent material from the workface.

* * * * *